（12） United States Patent
Plett

(10) Patent No.: US 7,525,285 B2
(45) Date of Patent: Apr. 28, 2009

(54) METHOD AND SYSTEM FOR CELL EQUALIZATION USING STATE OF CHARGE

(75) Inventor: Gregory L. Plett, Colorado Springs, CO (US)

(73) Assignee: LG Chem, Ltd. (KR)

( * ) Notice: Subject to any disclaimer, the term of this patent is extended or adjusted under 35 U.S.C. 154(b) by 353 days.

(21) Appl. No.: 10/985,703

(22) Filed: Nov. 11, 2004

(65) Prior Publication Data

US 2006/0097698 A1    May 11, 2006

(51) Int. Cl.
*H02J 7/00*    (2006.01)
*G01N 27/42*    (2006.01)
*G01N 27/416*    (2006.01)

(52) U.S. Cl. .................. 320/132; 320/134; 320/136; 324/425; 324/426; 324/427

(58) Field of Classification Search ............... 320/116, 320/132, 134, 136; 324/425–427
See application file for complete search history.

(56) References Cited

U.S. PATENT DOCUMENTS

| 6,534,954 | B1 | 3/2003 | Plett | 320/132 |
| 7,126,312 | B2* | 10/2006 | Moore | 320/157 |
| 2004/0032264 | A1* | 2/2004 | Schoch | 324/426 |

FOREIGN PATENT DOCUMENTS

| JP | 2002319438 | 10/2002 |
| JP | 2003516618 | 5/2003 |
| JP | 2003219572 | 7/2003 |

OTHER PUBLICATIONS

Gregory L. Plett; LiPB Dynamic Cell Models for Kalman-Filter SOC Estimation; The 19th International Battery, Hybrid and Fuel Electric Vehicle Symposium and Exhibition; Oct. 19-23, 2002; Busan, Korea; pp. 1-12.
Gregory L. Plett; Kalman-Filter SOC Estimation for LiPB HEV Cells; The 19th International Battery, Hybrid and Fuel Eletric Vehicle Symposium and Exhibition; Oct. 19-23, 2002; Busan, Korea; pp. 1-12.
Gregory L. Plett; Advances in EKF SOC Estimation for LiPB HEV Battery Packs; Powering Sustainable Transportation EVS 20; Nov. 15-19, 2003; Long Beach, California; pp. 1-12.

(Continued)

*Primary Examiner*—Akm Enayet Ullah
*Assistant Examiner*—Richard V Muralidar
(74) *Attorney, Agent, or Firm*—Cantor Colburn LLP

(57) ABSTRACT

The present invention relates to an implementation of a method for cell equalization. The present invention uses other information such as the individual cell state-of-charge (SOC) estimates, and individual capacities and/or cell Coulombic efficiencies, possibly available from a dual extended Kalman filter. The present invention defines or refers to an operational SOC range between a minimum and a maximum. The minimum and maximum could be constants or could be dynamic based on functions of other variables. SOC can be measured relative to maximum charge or relative to maximum discharge for each cell. When the SOC is not consistent across the cells, a prioritizing scheme is used to determine which cells require equalization.

25 Claims, 3 Drawing Sheets

OTHER PUBLICATIONS

Gregory L. Plett; Extended Kalman Filtering for Battery Management Systems of LiPB-based HEV Battery Packs Part 1 Background; Journal of Power Sources 134; 2004; pp. 225-261.

Gregory L. Plett; Extended Kalman Filtering for Battery Management Systems of LiPB-based HEV Battery Packs Part 2 Modeling and Identification; Journal of Power Sources 134; 2004; pp. 262-276.

Gregory L. Plett; Extended Kalman Filtering for Battery Management Systems of LiPB-based HEV Battery Packs Part 3 State and Parameter Estimation; Journal of Power Sources 134; 2004; pp. 277-292.

Stephen W. Moore and Peter J. Schneider; A Review of Cell Equalization Methods for Lithium Ion and Lithium Polymer Battery Systems; 2001 Society of Automotive Engineers; Jan. 2001; pp. 1-5.

Eric A. Wan and Alex T. Nelson; Dual Extended Kalman Filter; Methods; Kalman Filtering and Neural Networks; 2001; pp. 123-173.

Greg Welch and Gary Bishop; An Introduction to the Kalman Filter; SIGGRAPH 2001 Course 8; Los Angeles, California; Aug. 12-17, 2001; http: //Info.acm.org/pubs/toc/CRnotice.html; pp. 1-47.

* cited by examiner

METHOD AND SYSTEM FOR CELL EQUALIZATION USING STATE OF CHARGE

BACKGROUND

The present invention relates generally to cell equalization using state-of-charge (SOC) and, in particular, to cell equalization in a multi-cell battery pack.

Batteries are used in a wide variety of electronic and electrical devices. In the context of rechargeable battery pack technologies with multiple cells, it is often desirable to balance or equalize the cells in the battery pack. For example, it is desirable to balance or equalize cells that are configured in series strings. Cells are configured in series strings in order for battery packs to achieve high power levels with a reasonable current source/drain. The higher voltage of a series string allows a lower current for the same power level. Generally, in the prior art, the terms "balancing" and "equalizing" refer to the process of causing a terminal voltage of all the cells to converge to a constant level.

Over time, a battery pack's cells may become "out of balance" as small differences in their individual dynamics—principally, in their Coulombic efficiencies and capacities—cause their states-of-charge to drift apart from each other as the pack operates. Unfortunately, one or more cells may eventually limit the discharge ability of the pack by having state-of-charge (SOC) much lower than that of the others, and/or one or more cells may limit the charging capacity of the pack by having SOC much higher than that of the others. In an extreme case, the pack becomes incapable of either charge or discharge if one cell is at the low SOC limit and another is at the high SOC limit, even if all other cells have intermediate SOC values. Packs may be balanced or equalized by "boosting" (individually adding charge to) cells with SOC too low, "bucking" or "shunting" (individually depleting charge from) cells with SOC too high or "shuffling" (moving charge from one cell to another).

In some applications, for example, those with long discharge periods followed by a complete charge, equalization is only performed at the end-of-charge point in a charging process and continues until the pack is fully balanced. Other applications, however, require that the pack undergo continuous partial-charge and partial-discharge periods, and so equalization needs to be performed as the pack operates where cells in the battery pack have their charge levels adjusted continuously in a direction leading toward a fully balanced pack. Equalization may be halted if cells become close enough to full balance for the problem at hand, and may be resumed if the cells become significantly out of balance again.

In the prior art, determining which cells should have their charge levels adjusted to equalize the pack is generally done on the basis of cell voltage alone. If all cell voltages are the same, perhaps within some tolerance, the pack is considered properly balanced. If a cell's voltage is too high, then charge needs to be depleted from the cell. If a cell's voltage is too low, then charge needs to be added to the cell. Various electronic means are available to perform the equalization, either automatically, or under microprocessor control. These include: shuffling charge, depleting charge, and adding charge. For shuffling charge, charge is moved from one or more cells with voltage too high to one or more cells with voltage too low. A switched capacitor may be used or an energy-transfer method based on transformer windings may be used. For depleting charge, charge is depleted from one or more cells with voltage too high (e.g., with a switched resistor). For adding charge, charge is added from an external source, or from the pack itself (e.g., with a DC-DC converter). A disadvantage of using cell voltage as an indicator of when to perform equalization, as well as to control the cell equalization, is that it fails to maximize performance of the battery pack.

The purpose of equalization is to maintain the battery pack in a state where the maximum level of charge and discharge power is available for use. There is a need for a method of improving performance of a battery pack by boosting or bucking or shuffling charge among cells to maximize the pack availability.

SUMMARY OF THE INVENTION

To meet these needs and address these problems, various embodiments of methods and apparatus for cell equalization are disclosed. For example, disclosed in one exemplary embodiment is a method for cell equalization in battery packs, comprising: determining a state-of-charge for each cell of a plurality of cells; prioritizing the plurality of cells according to state-of-charge; and equalizing the plurality of cells according to the prioritizing.

In another exemplary embodiment there is disclosed a method for cell equalization in battery packs, comprising: determining a state-of-charge for each cell of a plurality of cells; determining at least one of a charge capacity and a discharge capacity for each cell of the plurality of cells; and equalizing one or more cells of the plurality of cells, when at least one of; a charge capacity of at least one cell of the plurality of cells is lower than a charge capacity of an other cell of the plurality of cells by a selected threshold, and a discharge capacity of at least one cell of the plurality of cells is lower than a discharge capacity of an other cell of the plurality of cells by a selected threshold.

Disclosed herein in another exemplary embodiment is system for cell equalization in battery packs, comprising: a battery pack with a plurality of cells; a sensor in operable communication with at least two cells of the plurality of cells configured to facilitate determination of state of charge for each cell of the at least two cells; and a controller in operable communication with the sensor and the plurality of cells. The controller is configured to to equalize charge of a cell of the at least two cells of the plurality of cells based on a state-of-charge for each cell of the plurality of cells.

Also disclosed herein in an exemplary embodiment is system for cell equalization in battery packs, comprising: a means for determining a state-of-charge for each cell of a plurality of cells; a means for determining at least one of a charge capacity and a discharge capacity for each cell of the plurality of cells; and a means for equalizing one or more cells of the plurality of cells, when at least one of; a charge capacity of at least one cell of the plurality of cells is lower than a charge capacity of an other cell of the plurality of cells by a selected threshold, and a discharge capacity of at least one cell of the plurality of cells is lower than a discharge capacity of an other cell of the plurality of cells by a selected threshold.

Disclosed herein in yet another exemplary embodiment is a storage medium encoded with a machine-readable computer program code, wherein the storage medium includes instructions for causing a computer to implement a method for cell equalization in battery packs.

Further, in another exemplary embodiment there is disclosed a computer data signal embodied in a computer readable medium the computer data signal comprising code configured to cause a computer to implement a method for cell equalization in battery packs

BRIEF DESCRIPTION OF THE DRAWINGS

These and other features, aspects and advantages of the present invention will become better understood with regard to the following description, appended claims and accompanying drawings wherein like element are numbered alike:

DETAILED DESCRIPTION OF THE INVENTION

Disclosed herein in one or more exemplary embodiments is a methodology and system for cell equalization using state of charge (SOC). In particular, by employing additional information such as the individual cell SOC estimates, and possibly individual capacities and/or cell Coulombic efficiencies, beyond cell voltage, equalization of a plurality of cells is possible. In another exemplary embodiments SOC computed based on standard, or dual Kalman filtering or a standard, or dual extended Kalman filter, equalizing cell voltage is further enhanced to maximize battery pack level of charge and discharge power.

Figure 1:
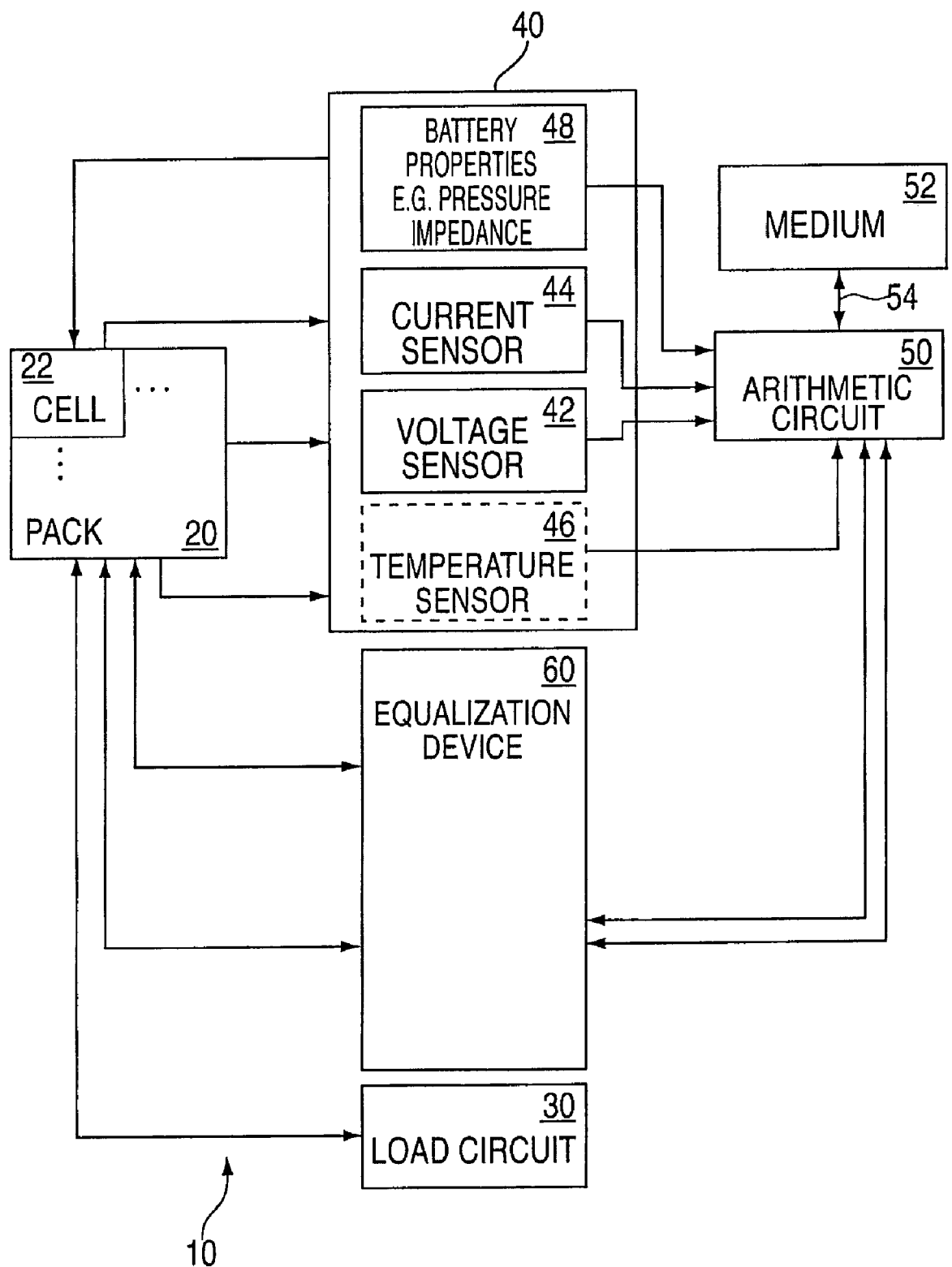
FIG. 1 depicts an exemplary system for cell equalization in accordance with an exemplary embodiment.

FIG. 1 shows the components of a cell equalization system 10 according an embodiment of the present invention. Electrochemical cell pack 20 comprising a plurality of cells 22, e.g., battery is connected to a load circuit 30. For example, load circuit 30 could be a motor in an Electric Vehicle (EV) or a Hybrid Electric Vehicle (HEV). An apparatus for measuring state of charge is provided as 40. The SOC measurement apparatus 40 may include but not be limited to a device for measurement of cell terminal voltage are made with a voltage sensor 42, e.g., voltmeter and the like, while measurements of cell current are made with a current sensing device 44, e.g., an ammeter and the like. Optionally, measurements of cell temperature are made with a temperature sensor 46, e.g., thermometer and the like. Pressure sensors and/or impedance sensors 48 are also possible and may be employed for selected types of cells. Various sensors may be employed as needed to evaluate the characteristics and properties of the cell(s). Voltage, current, and optionally temperature and measurements of other cell properties measurements are processed with an arithmetic circuit 50, e.g., processor or computer, which estimates the states and parameters of the cell. That may include or command the equalization device 60 configured to manipulate the charge of each cell 22 of the pack 20. The system may also include a storage medium 52 comprising any computer usable storage medium known to one of ordinary skill in the art. The storage medium is in operable communication with arithmetic circuit 50 employing various means, including, but not limited to a propagated signal 54.

In order to perform the prescribed functions and desired processing, as well as the computations therefore (e.g., the equalization of cells prescribed herein, and the like), arithmetic circuit 50 may include, but not be limited to, a processor(s), gate array(s), custom logic, computer(s), memory, storage, register(s), timing, interrupt(s), communication interfaces, and input/output signal interfaces, as well as combinations comprising at least one of the foregoing. Arithmetic circuit 50 may also include inputs and input signal filtering and the like, to enable accurate sampling and conversion or acquisitions of signals from communications interfaces and inputs. Additional features of arithmetic circuit 30 and certain processes therein are thoroughly discussed at a later point herein.

One or more embodiments of the invention may be implemented as new or updated firmware and software executed in arithmetic circuit 50 and/or other processing controllers. Software functions include, but are not limited to firmware and may be implemented in hardware, software, or a combination thereof. Thus a distinct advantage of the present invention is that it may be implemented for use with existing and/or new processing systems for electrochemical cell charging and control.

Figure 2:
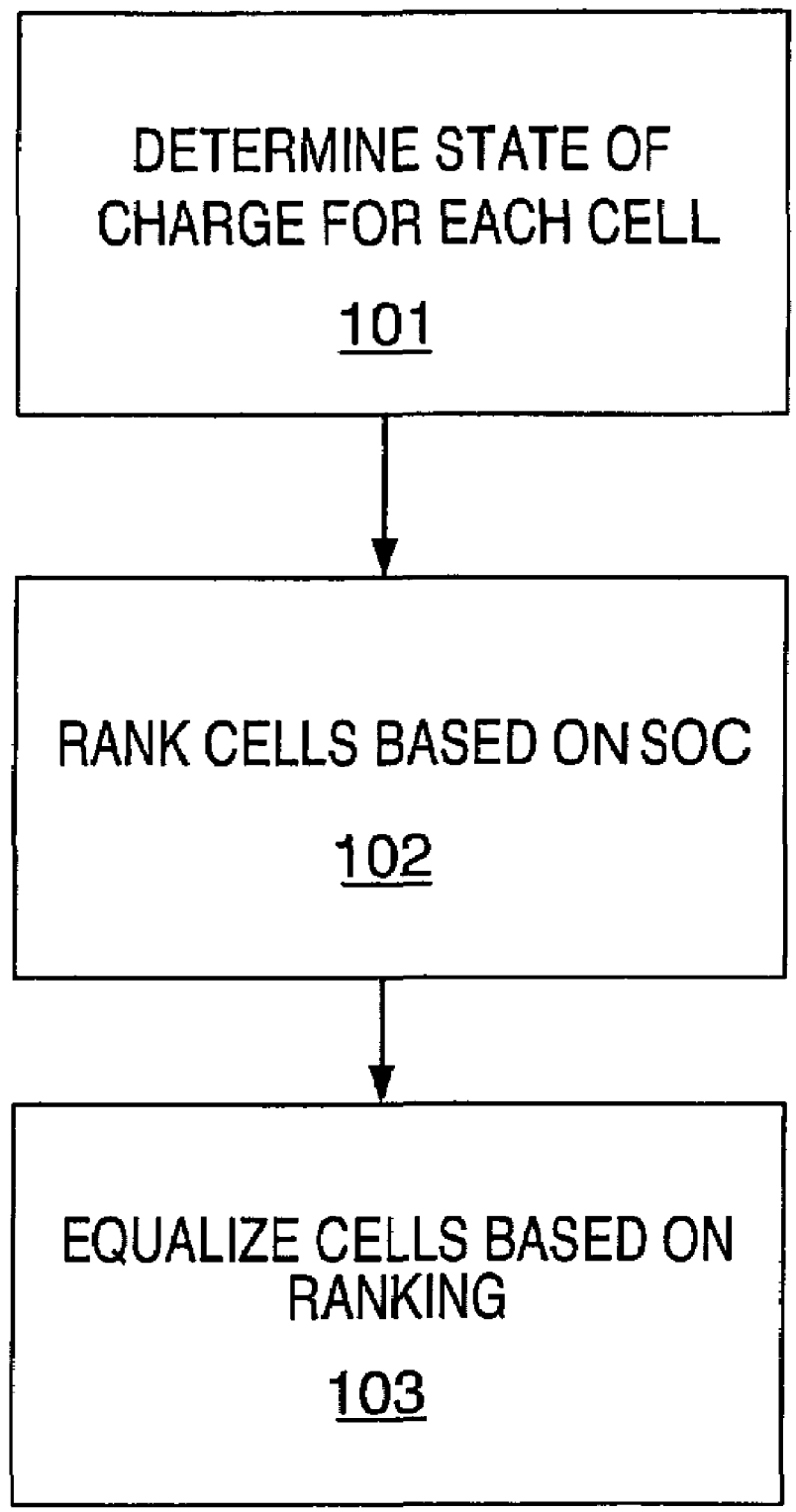
FIG. 2 is a flow diagram illustrating an exemplary methodology in accordance with an exemplary embodiment of the present invention.

A methodology for cell equalization is illustrated in FIG. 2. In an exemplary embodiment, the cells to equalize are determined in order to maximize the available power from a battery pack. In an exemplary embodiment, SOC is determined for the cells of a battery pack and the cells are ranked according to their respective SOC. An equalization process is applied to the cells based on this ranking. At step 101, the SOC is determined for each cell and may be an ongoing process, in some embodiments. After SOC is determined, the cells are ranked at step 102 based on their individual SOCs. At step 103, an equalization process is applied to the cells based on this ranking. For example, the equalization could be performed by adding or deleting charge, charge shuffling, or any other energy transformation scheme suitable. The decision to proceed with equalization is based on SOC, not on voltage levels as in the prior art. In addition, the sufficiency of the equalization process is determined by SOC measurements.

If error bounds on the SOC estimate are available, they may be used to determine when to stop equalization. One example is if some form of Kalman filtering (e.g., an extended Kalman filter) is used to estimate SOC, then the error bounds may be computed as a function of the SOC estimation error covariance. In an example implementation, one might turn off equalization if the difference between maximum and minimum SOC falls within a function of the SOC error bounds.

In addition, if the same cell is targeted for both boosting and bucking, it is the cell limiting performance whether or not its SOC is changed, so equalization may be turned off.

Figure 3:
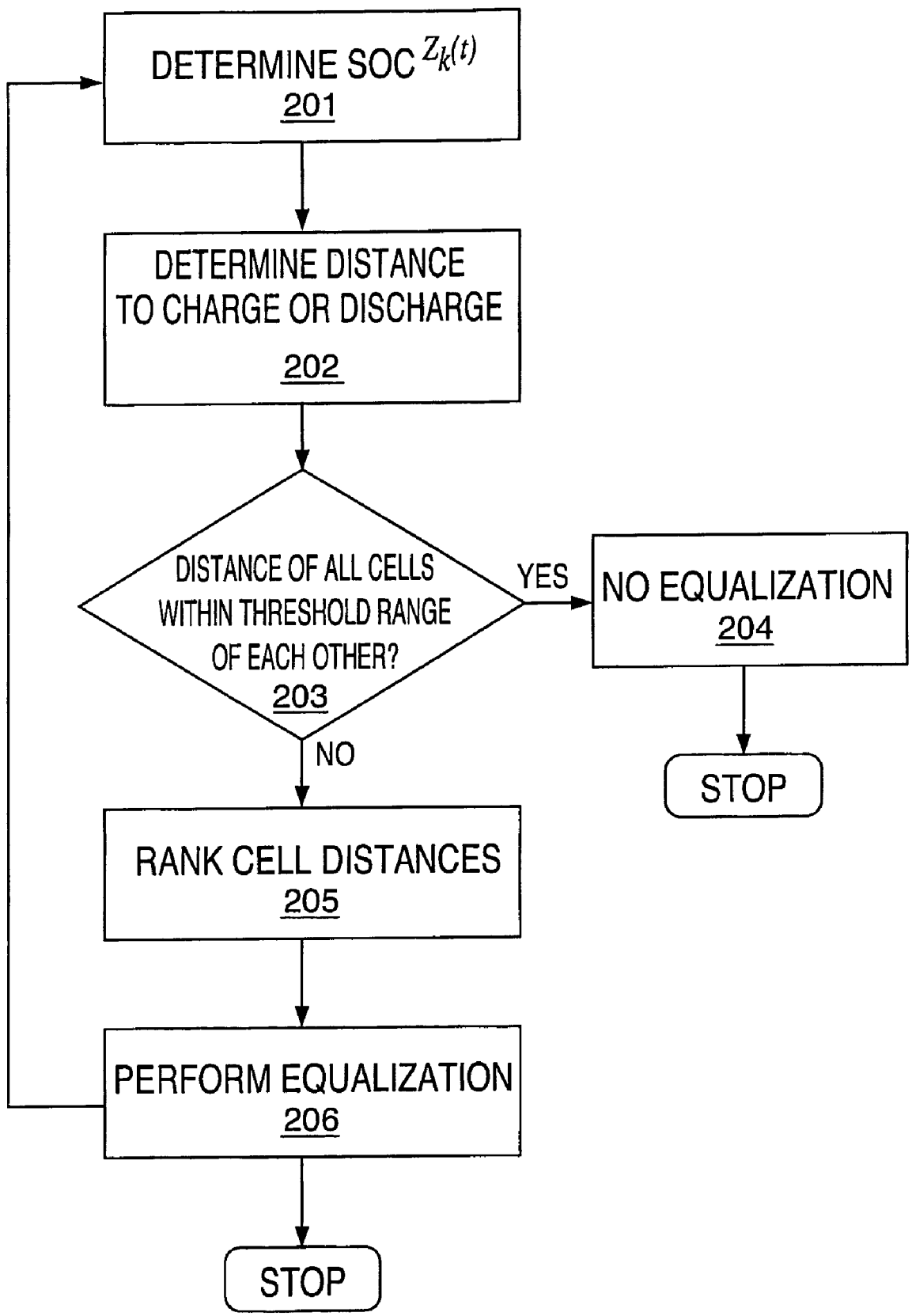
FIG. 3 is a flow diagram illustrating another exemplary methodology, in accordance with an exemplary embodiment of the present invention.

FIG. 3 is a flow diagram illustrating another exemplary method. In implementing embodiments of the present invention on a pack of cells, assume that the pack comprises k cells (or modules of parallel-connected cells) connected in series. At step 201, the SOC of each of these cells (or modules) is determined by known means and is denoted by $z_k(t)$, where t indicates time.

There are a number of existing methods for estimating the state of a charge of a cell. SOC is a value, typically reported in percent, which indicates the fraction of the cell capacity presently available to do work. A number of different approaches to estimating SOC have been employed: a discharge test, ampere-hour counting (Coulomb counting), measuring the electrolyte, open-circuit voltage measurement, linear and nonlinear circuit modeling, impedance spectroscopy, measurement of internal resistance, coup de fouet, and some forms of Kalman filtering. Each of these methodologies exhibits advantages as well as limitations.

Another method for determination of SOC is disclosed in commonly assigned U.S. Pat. No. 6,534,954 to Plett, the contents of which are incorporated by reference herein in their entirety. Similarly, SOC may be calculated as disclosed in commonly assigned U.S. patent application Ser. No. 10/985,617, filed on Nov. 11, 2004 also by Plett, the contents of which are incorporated by reference herein in their entirety. In these examples, a filter, preferably a Kalman filter is used to estimate SOC by employing a known mathematical model of cell dynamics and measurements of cell voltage, current, and temperature. Advantageously, these methods directly estimate state values for the cell where SOC is at least one of the states. Moreover, these methodologies enhance the equalization methodologies of the exemplary embodiments disclosed herein by facilitating establishing termination conditions for the equalization of cells. It will be appreciated that there are numerous well-known methodologies for computing SOC.

In one exemplary embodiment, there are operational design limits established such that SOC $z_k(t)$ is maintained within in the range $z_{min} \leq z_k(t) \leq z_{max}$, where $z_{min}$ and $z_{max}$ might be constants, or might be functions of other variables (such as temperature). Further, in cases where no other limits are applied, then we may consider $z_{min}=0\%$ and $z_{max}=100\%$.

Continuing with FIG. 2, at step 202, for SOC of each cell k at level $z_k(t)$, the quantity of charge that can be accepted by this cell in ampere-hours from an upper limit, denoted present charge capacity, or the quantity of charge that can be depleted this cell to a lower limit, denoted present discharge capacity. The upper limit distance (present charge capacity) is represented as:

$$C_k^{charge}(t)=(z_{max}-z_k(t))C_k/\eta_k, \quad (1)$$

and the distance in ampere-hours from the lower limit (present discharge capacity) is:

$$C_k^{discharge}(t)=(z_k(t)-z_{min})C_k, \quad (2)$$

where $C_k$ is the capacity of cell k, in ampere-hours and $\eta_k$ is the Coulombic efficiency of cell k. If all cells exhibit substantially equivalent present charge capacity, $C_k^{charge}(t)$, (or within some threshold range of each other, e.g. within 5%), at step 203, then no cell will limit pack charge capacity and no equalizing is needed as indicated at step 204. Similarly, if all cells have equal $C_k^{discharge}(t)$, (or within the threshold range) then no cell will limit pack discharge capacity and no equalizing is required at step 204. Note that embodiments of the present invention may be practiced using either charge distance or discharge distance (or both) without departing from the scope of the invention.

However, if the capacity $C_k^{charge}(t)$ of at least one cell is lower than that of others by, for example, the threshold amount, this cell will limit the ability of the pack to accept charge and therefore, equalization is desired. Similarly, if the capacity $C_k^{discharge}(t)$ of one cell is lower than the others (or outside the acceptable threshold range of similarity), this cell will limit the ability of the pack to supply charge to a load and equalization should be performed.

If equalization is desired, the "distance" information is used to determine which cells require equalization at step 205 and equalization is applied at step 206, according to the following exemplary methodology.

1. Compute $C_k^{discharge}(t)$ for all cells, and sort from smallest to largest. The cells with smallest value may benefit from having some charge depleted (via bucking, charge shuffling, or energy transformation) prioritized in reverse order by the magnitude of its $C_k^{discharge}(t)$
2. Compute $C_k^{charge}(t)$ for all cells, and sort from smallest to largest. The cells with smallest value may benefit from having charge added (via boosting, charge shuffling, or energy transformation) prioritized in reverse order by the magnitude of its $C_k^{charge}(t)$.
3. If charge shuffling is available, it is shuffled from the cells with minimum $C_k^{charge}(t)$ to cells with minimum $C_k^{discharge}(t)$, prioritized in reverse order by the corresponding magnitudes.

If error bounds on the SOC estimate are available, they may be used to determine when to stop equalization. For example, if some form of Kalman filtering (e.g., a Kalman filter, an extended Kalman filter, and the like) is used to estimate SOC, then the error bounds may be computed as a function of the SOC estimation error covariance. In an example implementation, equalization may be terminated if the difference between maximum and minimum $C_k^{discharge}(t)$ and the difference between maximum and minimum $C_k^{charge}(t)$ falls within a function of the SOC error bounds. In addition, if the same cell is targeted for both boosting and bucking, it is the cell limiting performance whether or not its SOC is changed, so equalization may be terminated.

If cell capacity information is not individually available, then the nominal capacity $C_n$ may be used. If cell Coulombic efficiency information is not individually available, then the nominal efficiency $\eta_k$ may be used. If so, the procedure then equalizes SOC.

In summary, various embodiments are disclosed of ways of determining which cells in a battery pack having a series-connected string of cells or modules are be equalized. Some embodiments do not simply equalize cell voltage, but also maximize the pack availability. Some embodiments incorporate knowledge, if available, of individual cell capacities and Coulombic efficiencies. As cells in a battery pack age, their characteristics will not remain equal, so using the disclosed embodiments the pack provides better performance in the long run. Various embodiments include methods to equalize a series string of cells on a continuous basis. An example context is a battery system in a Hybrid Electric Vehicle (HEV). Note that the invention is not limited to vehicular applications, however, but may be applicable to any situation where cell equalization is desired.

The disclosed method may be embodied in the form of computer-implemented processes and apparatuses for practicing those processes. The method can also be embodied in the form of computer program code containing instructions embodied in tangible media 52, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal 54 transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for cell equalization in battery packs, comprising:
   determining a state-of-charge for each cell of a plurality of cells;
   determining
   a charge capacity performed by
      i) calculating a difference between a selected maximum state-of-charge for said each cell and a present state-of-charge for said each cell,
      ii) multiplying said difference by a total capacity for each said cell or by a nominal capacity for said each cell, and
      iii) employing a Coulombic efficiency calculation; and
   equalizing one or more cells of said plurality of cells, when the charge capacity of at least one cell of said plurality of cells is lower than a charge capacity of an other cell of said plurality of cells by a selected threshold.

2. The method of claim 1 wherein said equalizing is performed by depleting some charge from one or more cells of said plurality of cells having charge capacity less than a charge capacity of a selected cell from said plurality of cells by a selected threshold.

3. The method of claim 2, wherein said one or more cells having charge capacity less than a charge capacity of a selected cell from said plurality of cells by a selected threshold is determined by sorting said plurality of cells by charge capacity.

4. The method of claim 1 wherein said equalizing is performed by moving charge from a first one or more cells to another one or more cells of said plurality of cells.

5. The method of claim 1 wherein equalizing is only performed when a difference between a selected maximum state-of-charge and a selected minimum state-of-charge of said plurality of cells meets or exceeds a selected threshold.

6. The method of claim 1 wherein state-of-charge is determined using a form of at least one of a Kalman filter, a dual Kalman filter, an extended Kalman filter, and a dual extended Kalman filter.

7. The method of claim 1 wherein said equalizing is only performed when a selected state-of-charge estimate falls outside an error bound of another selected state-of-charge estimate by a selected threshold.

8. The method of claim 7 wherein said equalizing is performed when a selected state-of-charge estimate falls outside an error bound of another selected state-of-charge estimate by a selected threshold where said error bound are computed using a state of charge estimation error covariance estimate.

9. The method of claim 1 wherein said equalizing is terminated if a difference between a selected maximum charge capacity and selected minimum charge capacity falls within a selected threshold.

10. The method of claim 1 wherein said equalizing is terminated if a cell is targeted for both adding charge and depleting charge.

11. A system for cell equalization in battery packs, comprising:
    a battery pack with a plurality of cells;
    a sensor in operable communication with at least two cells of said plurality of cells configured to facilitate determination of state of charge for each cell of said at least two cells; and
    a controller in operable communication with said sensor and said plurality of cells for determining
    a charge capacity performed by
       i) calculating a difference between a selected maximum state-of-charge for said each cell and a present state-of-charge for said each cell,
       ii) multiplying said difference by a total capacity for each said cell or by a nominal capacity for said each cell, and
       iii) employing a Coulombic efficiency calculation;
    wherein said controller is configured to equalize charge of each cell of said at least two cells of said plurality of cells based on the state-of-charge for each cell of said plurality of cells.

12. The system of claim 11 further including a device configured to equalize charge of a cell of said at least two cells of said plurality of cells in operable communication with said plurality of cells and said controller.

13. The system of claim 11 wherein said controller equalizes one or more cells of said plurality of cells, when the charge capacity of at least one cell of said plurality of cells is lower than a charge capacity of an other cell of said plurality of cells by a selected threshold.

14. The system of claim 11 wherein said equalizing is performed by depleting some charge from one or more cells of said plurality of cells having charge capacity less than a charge capacity of a selected cell from said plurality of cells by a selected threshold.

15. The system of claim 14 wherein said one or more cells having charge capacity less than a charge capacity of a selected cell from said plurality of cells by a selected threshold is determined by sorting said plurality of cells by charge capacity.

16. The system of claim 11, wherein equalizing charge is performed by moving charge from a first one or more cells to another one or more cells of said plurality of cells.

17. The system of claim 11 wherein equalizing charge of a cell is only performed when a difference between a selected maximum state-of-charge and a selected minimum state-of-charge of said plurality of cells meets or exceeds a selected threshold.

18. The system of claim 11 wherein state-of-charge is determined using a form of at least one of a Kalman filter, a dual Kalman filter, an extended Kalman filter, and a dual extended Kalman filter.

19. The system of claim 11 wherein equalizing charge is only performed when a selected state-of-charge estimate falls outside an error bound of another selected state-of-charge estimate by a selected threshold.

20. The system of claim 19 wherein said equalizing charge is performed when a selected state-of-charge estimate falls outside an error bound of another selected state-of-charge estimate by a selected threshold where said error bound are computed using a state of charge estimation error covariance estimate.

21. The system of claim 11 wherein equalizing charge is terminated if a difference between a selected maximum discharge capacity and a selected minimum discharge capacity or a difference between a selected maximum charge capacity and selected minimum charge capacity falls within a selected threshold.

22. The system of claim 11 wherein equalizing charge is terminated if a cell is targeted for both adding charge and depleting charge.

23. A system for cell equalization in battery packs, comprising:

a means for determining a state-of-charge for each cell of a plurality of cells;

a means for determining
- a charge capacity performed by
  - i) calculating a difference between a selected maximum state-of-charge for said each cell and a present state-of-charge for said each cell,
  - ii) multiplying said difference by a total capacity for each said cell or by a nominal capacity for said each cell, and
  - iii) employing a Coulombic efficiency calculation; and a means for equalizing one or more cells of said plurality of cells, when the charge capacity of at least one cell of said plurality of cells is lower than a charge capacity of an other cell of said plurality of cells by a selected threshold.

24. A storage medium encoded with a machine-readable computer program code, wherein said storage medium includes instructions for causing a computer to implement a method for cell equalization in battery packs comprising:

determining a state-of-charge for each cell of a plurality of cells;

determining
- a charge capacity performed by
  - i) calculating a difference between a selected maximum state-of-charge for said each cell and a present state-of-charge for said each cell,
  - ii) multiplying said difference by a total capacity for each said cell or by a nominal capacity for said each cell, and
  - iii) employing a Coulombic efficiency calculation; and equalizing one or more cells of said plurality of cells, when the charge capacity of at least one cell of said plurality of cells is lower than a charge capacity of an other cell of said plurality of cells by a selected threshold.

25. A computer data signal embodied in a computer readable medium said computer data signal comprising code configured to cause a computer to implement a method for cell equalization in battery packs comprising:

determining a state-of-charge for each cell of a plurality of cells;

determining
- a charge capacity performed by
  - i) calculating a difference between a selected maximum state-of-charge for said each cell and a present state-of-charge for said each cell,
  - ii) multiplying said difference by a total capacity for each said cell or by a nominal capacity for said each cell, and
  - iii) employing a Coulombic efficiency calculation, and a discharge capacity for each cell of said plurality of cells; and equalizing one or more cells of said plurality of cells, when the charge capacity of at least one cell of said plurality of cells is lower than a charge capacity of an other cell of said plurality of cells by a selected threshold.

* * * * *